UNITED STATES PATENT OFFICE.

CHARLES GRAEBE, OF FRANKFORT-ON-THE-MAIN, AND CHARLES LIEBERMANN, OF BERLIN, PRUSSIA.

IMPROVED PROCESS OF PREPARING ALIZARINE.

Specification forming part of Letters Patent No. 95,465, dated October 5, 1869.

*To all whom it may concern:*

Be it known that we, CHARLES GRAEBE, of Frankfort-on-the-Main, and CHARLES LIEBERMANN, of Berlin, in the Kingdom of Prussia, have invented a Process for Preparing Alizarine from Anthracene; and we do hereby declare the following to be a full, clear, and exact description thereof, which will enable those skilled in the art to make and use the same.

We first change the anthracene into anthrakinon, (oxanthracen,) a substance known to chemists by the investigations of Anderson. For this purpose we take one part, by weight, of anthracene, two and a half parts, by weight, of bichromate of potassa, and ten or fifteen parts, by weight, of concentrated acetic acid, and we heat these substances together in a vessel, either of glass or clay, to about 100° centigrade to 120° centigrade, till nearly all of the bichromate of the potassa is dissolved, and the liquid has acquired a deep-green color.

We then recover the acetic acid not consumed in the reaction by distillation, and treat the residuum with water, to remove the chromic acetate. From the insoluble mass we obtain the anthraKinon in a pure state by distilling the whole from a retort of glass or iron.

In the place of the acetic acid, sulphuric acid diluted with one or two parts of water may be employed.

Instead of the method just described, we also employ the following one: We heat the anthracene in a vessel of glass or of clay, with ten parts of concentrated acetic acid, to about 100° centigrade, or a little higher, and we add nitric acid, of about 1.3 specific gravity, in small portions, till the violent reaction ceases. After distillation of the acetic acid we purify the residuum as before.

We then convert the anthrakinon prepared by one of the methods described into bibromanthrakinon. For this purpose we take three parts of anthrakinon, five parts of bromine, and we heat these substances, for ten or twelve hours, or until nearly the whole of the bromine has disappeared, to a temperature, by preference, of about 100° centigrade, in a suitable closed vessel, either of glass, or enameled or glazed iron, which is capable of sustaining the pressure generated by the reaction.

The apparatus is then allowed to cool. It is opened in order to permit the escape of hydrobromic acid, which can be recovered by absorption, either in water or in an alkaline solution. We purify the bibromanthrakinon, remaining in the vessel as a solid substance by crystallization from benzole.

Instead of the method above described for preparing bibromanthrakinon, we also employ the following: We convert, first, the anthracene into a bromine derivative, into the tetrabromanthracene, known to chemists by the investigations of Anderson. We take one part of this tetrabromanthracene, and we heat it in a retort of glass or clay, with about five parts of nitric acid, of about 1.3 specific gravity to 100° centigrade, as long as vapors of bromine are evolved. We distill off the greater portion of the nitric acid, wash the residuum with water, and purify it by crystallization from benzole. We thus receive the bibromanthrakinon, as before, in the form of a yellow solid mass.

We then convert the bibromanthrakinon into alizarine. For this purpose we take one part of bibromanthrakinon, two to three parts of caustic potash or soda, and so much water as is necessary to dissolve the alkali, and we heat the whole in an open vessel of glass, glazed or enameled iron or silver, to about 180° to 260° centigrade, for one hour, or till the mass has acquired a deep-blue color.

We then dissolve it in the water, and filter the violet solution, from which we precipitate the alizarine by an inorganic or organic acid. We collect the yellow flocks of alizarine thus obtained on a filter, and wash them with water.

By these methods we receive the alizarine in a form in which it can be employed in the same manner as the different preparations from madder.

In the place of bromine, chlorine also may be employed, but not so conveniently, as the reactions above described are more difficult to accomplish with chlorine than with bromine.

Having thus described the nature of our invention, and the manner of performing and carrying out the same, we would have it understood that we do not confine ourselves to the exact details hereinbefore given; but

What we claim is—

The within-described process for the production of alizarine, by first preparing bi-bromanthrakinon or bichloranthrakinon, and then converting these substances into alizarine, substantially as above set forth.

CHARLES GRAEBE.
CHARLES LIEBERMANN.

In presence of—
FR. F. PRILLWITE,
N. GOTTHEIL.